Nov. 26, 1963   H. L. HILDEBRAND   3,112,084
APPARATUS FOR FABRICATING TUBULAR STOCK
Filed June 13, 1960   10 Sheets-Sheet 1

FIG. I.

INVENTOR.
HARRY L. HILDEBRAND
BY
Bruser, Smith & Harding
ATTORNEYS

Nov. 26, 1963  H. L. HILDEBRAND  3,112,084
APPARATUS FOR FABRICATING TUBULAR STOCK
Filed June 13, 1960  10 Sheets-Sheet 3

FIG. 3.

INVENTOR.
HARRY L. HILDEBRAND
BY
Busser, Smith & Harding
ATTORNEYS

Nov. 26, 1963   H. L. HILDEBRAND   3,112,084
APPARATUS FOR FABRICATING TUBULAR STOCK
Filed June 13, 1960   10 Sheets-Sheet 6

INVENTOR.
HARRY L. HILDEBRAND
BY
Busser, Smith & Harding
ATTORNEYS

FIG. 9.

INVENTOR.
HARRY L. HILDEBRAND

INVENTOR.
HARRY L. HILDEBRAND
BY
Busser, Smith & Harding
ATTORNEYS

Nov. 26, 1963  H. L. HILDEBRAND  3,112,084
APPARATUS FOR FABRICATING TUBULAR STOCK
Filed June 13, 1960  10 Sheets-Sheet 9

INVENTOR.
HARRY L. HILDEBRAND
BY
Busser, Smith & Harding
ATTORNEYS

FIG. 15.

United States Patent Office 3,112,084
Patented Nov. 26, 1963

3,112,084
APPARATUS FOR FABRICATING TUBULAR STOCK
Harry L. Hildebrand, Norristown, Pa., assignor to Taylor Corporation, a corporation of Delaware
Filed June 13, 1960, Ser. No. 35,552
3 Claims. (Cl. 242—56)

This invention relates generally to the fabrication of tubular stock, and particularly to improvements in apparatus for fabricating a laminated tubular member from a single web of sheet material treated with resins or similar substances.

An object of the present invention is to provide such apparatus with means for automatically feeding sheet material from a supply roll thereof to a mandrel about which a length of the material is to be wound to form a laminated tubular member.

Another object is to provide such apparatus with means for drawing said sheet material from the supply roll and automatically responsive to the progressively changing size of the latter for maintaining uniform tension on the section of sheet material extending from the supply roll to the mandrel about which it is being wound.

Another object of the invention is to provide such apparatus with means for automatically severing the section of sheet material out of which the tube is being formed from the supply roll and terminating the winding operation when the tube is of a predetermined outside diameter.

Another object is to provide such apparatus with roller means operable for engaging a resin-coated surface of said material and winding said sheet material about said mandrel, and with scraper means for continuously maintaining a surface of said roller means free from resin deposited thereon by said sheet material.

Other objects of the invention will become apparent when the following description is read with reference to the accompanying drawings, in which.

Apparatus embodying the present invention comprises a rigid floor-supported base structure having a main section 10 and a section 12 to the rear of section 10 and tied thereto by an intermediate section 14.

Figure 9:
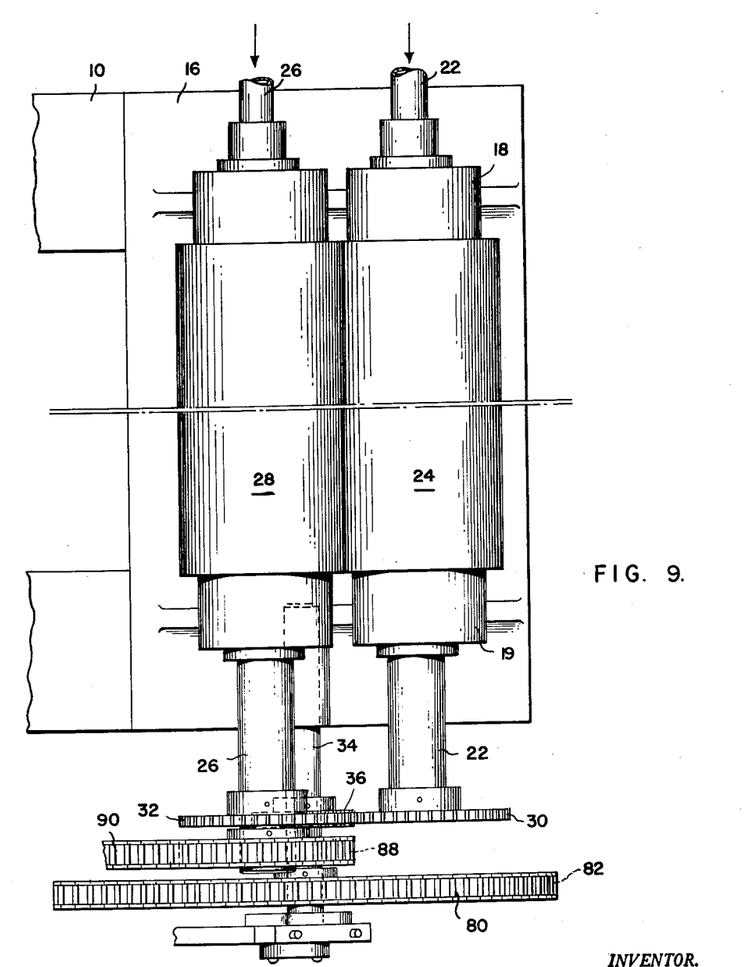
FIGURE 9 is an enlarged plan view, as indicated by line 9—9 of FIGURE 3.

Mounted upon a top surface 16 of section 10 are a pair of bearing units 18 and 19 secured by bolts 20. A tubular shaft 22 has opposite end portions journalled respectively in the units 18 and 19 and carries a front mandrel support roller 24. A second tubular shaft 26 also has opposite portions journalled respectively in the units 18 and 19 and carries a rear mandrel support roller 28. Referring particularly to FIGURE 9, mounted upon the shaft 22 is a gear 30 and mounted upon the shaft 26 is a gear 32. Journalled in the unit 19 is one end portion of a stub shaft 34 and mounted upon this stub shaft is a gear 36 which meshes with the gears 30 and 32. It will be understood, of course, that the gears 30 and 32 do not mesh with one another.

Figure 10:
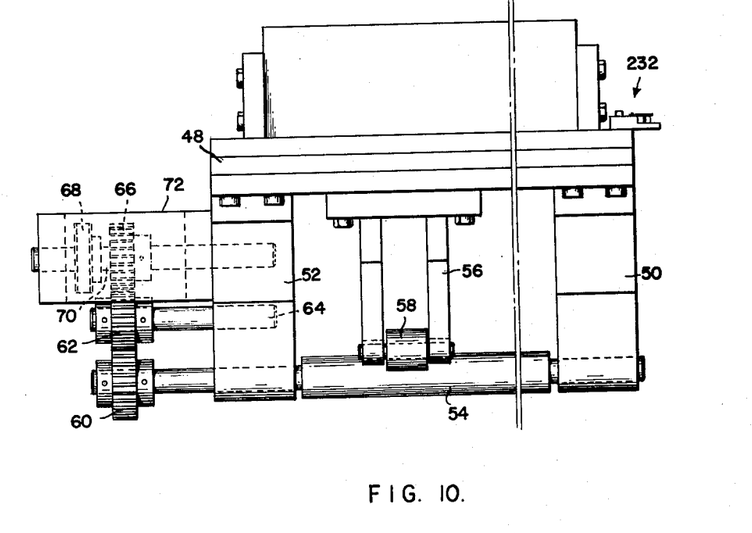
FIGURE 10 is an enlarged front view of the head of the apparatus, as indicated by line 10—10 of FIGURE 3.

Overlying the surface 16 of the base section 10 is a plate 38 upon which are seated a pair of head frame bearings 40 secured by bolts 42. Opposite end portions of a shaft 44 are journalled respectively in the bearings 40 and have affixed thereto laterally spaced head frame arms 46. Corresponding fore end portions of the arms 46 carry a head rail 48. Referring particularly to FIGURE 10, depending from opposite end portions of this head rail respectively are brackets 50 and 52. A head roller 54 has opposite end portions journalled respectively in the brackets 50 and 52. Also depending from the head rail 48 are a number of brackets 56 each mounting a pair of laterally spaced short idler rollers 58 each engaging with the roller 54. Mounted upon one terminal portion of the head roller 54 is a gear 60 which meshes with an idler gear 62 mounted upon a stub shaft 64 journalled in the bracket 52. The gear 62 meshes with a gear 66, which latter gear and another gear, designated 68, are mounted upon a shaft 70 having opposite end portions journalled respectively in the bracket 52 and a bracket 72 affixed to the head rail 48.

At the foot of the machine is an electric motor and change speed unit 74 having mounted upon a drive shaft 76 a sprocket 78 about which is trained a chain 80. This chain is also trained about a sprocket 82 which is mounted upon the stub shaft 34. For taking up the slack in the chain 80 there is provided a sprocket 84 which is mounted upon a bracket 86. It will be evident that when the stub shaft 34 is rotated, the gear 36 turns the shafts 22 and 26 respectively through the gears 30 and 32. Mounted upon the shaft 26 is a sprocket 88 and trained about this sprocket is a chain 90, which chain is also trained about a sprocket 92 suitably carried by the shaft 44. For taking up the slack in the chain 90 there is provided an idler sprocket 94 carried by a bracket 96. Also suitably mounted upon the shaft 44 is a sprocket 98 adapted to be driven by the sprocket 92 and about which is trained a chain 100, the latter also being trained about the sprocket 68. For taking up the slack in the chain 100 there is provided an idler sprocket 102 carried by a bracket 104.

Affixed to the shaft 44 is an arm 106 having pivotally connected thereto, as at 108, the rod 110 of a hydraulically actuated piston adapted to work in the cylinder 112. This cylinder is pivoted, as at 114, to a bracket 116 secured to the base section 10.

Journalled in the bearing 40 are the opposite end portions of a shaft 118 to which are secured the laterally spaced arms 120 of a cutter frame. Corresponding end portions of the arms 120 carry a cutter rail 122. A member 124 having a serrated cutting edge is secured by bolts 126 to the cutter rail 122. Each arm 46 is provided with a pivot 128 from which depends a link 30 having formed in a roller end portion thereof a slot 132 through which there extends a pin 134 mounted upon the corresponding arm 120 of the cutter frame.

Mounted upon the base section 10 are a pair of brackets 136 secured by bolts 138. Journalled in the brackets 136 are opposite end portions of a shaft 140, which shaft mounts a feed roller 142 and a pair of cams 144. Secured to this shaft is an arm 146 mounting a pivot 148 from which there depends a rod 150 associated with a solenoid S1. Biasing the rod 150 upwardly is a tension spring 154. Each end of the rail 122 mounts a stop 156 secured by bolts 158. The one end of the stop 156 is provided with a groove 160 which has seated therein the nose of the associated cam 144, rounded as at 162.

The brackets 136 have secured thereto respectively the opposite end portions of a stationary cutter bar 164 adapted for coaction with the movable cutter bar 124.

Figure 11:
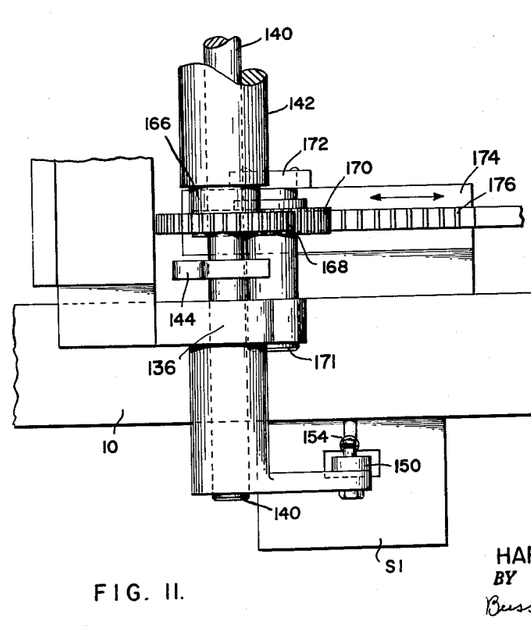
FIGURE 11 is an enlarged fragmentary plan view, as indicated by the line 11—11 of FIGURE 2.

Referring particularly to FIGURE 11, adjacent one end of the feed roller 142 is a slip clutch 166 and an associated gear 168 carried by the shaft 144. This gear meshes with a gear 170 mounted upon a stub shaft 171 having opposite end portions journalled respectively in the associated bracket 136 and a bracket 172. This bracket is secured to a channel bar 174 which in turn is secured to the base section 10. Slidably fitted in the channel bar 174 is a rack 176 meshing with the gear 170 and extending from the rod of a pneumatically operated piston working in a cylinder 178.

Carried by the shaft 118 are a pair of laterally spaced arms 182 of a hold-down frame. The arms 182 carry a rail 184 and mount a hold-down roller 186 overlying the feed roller 142.

Secured to the base section 10 are a bracket 188 and a bearing 190, each of which has journalled therein a stub shaft 192 of a tensioning frame having end bars 194 and laterally spaced twister bars 196. The stub shaft 192 that is journalled in the bracket 188 mounts a pinion 198 which meshes with a rack 200 slidable in the bracket 188. This rack is attached to the rod 202 of a pneumatically actuated piston which works in a pneumatic cylinder 204, suitable stops being provided, as at 206 and 208, for limiting the excursion of the rack 200. Extending from the cylinder 204 is a line 210 having connected therein a pressure-regulator device 212.

Figures 7, 8:
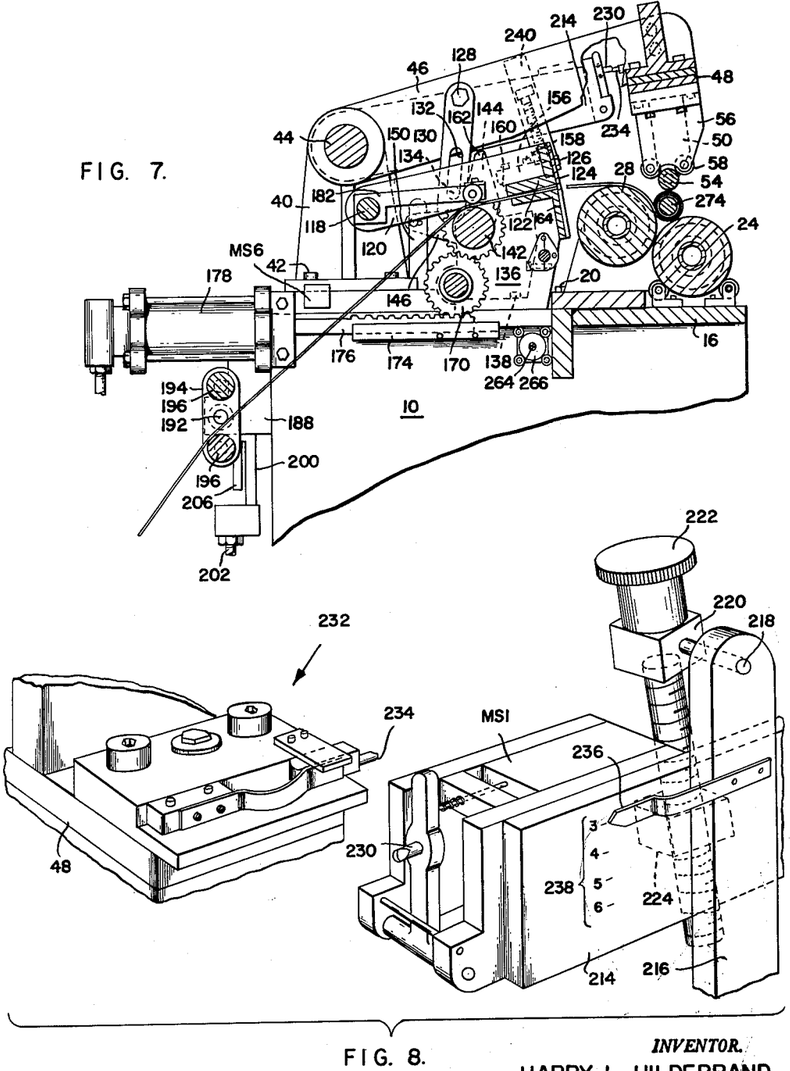
FIGURE 7 is the same as FIGURE 6, but shows the tube almost fully formed and the web of sheet material severed.
FIGURE 8 is a perspective view of a control switch and means for operating the same.

Pivotally connected to the shaft 44 is a switch support arm 214, the fore end portion of which is carried by a bar 216 extending upwardly from the associated bracket 136. Referring particularly to FIGURE 8, a pivot 218 at the upper end of the bar 216 mounts a collar 220 through which there extends an adjusting screw 222. The lower end portion of this screw is threaded through a collar 224 which is pivotally connected to the arm 214. A switch MS1 having an arm 230 is mounted upon the fore end portion of the arm 214. The head rail 48 carries switch arm actuating means, generally designated 232, including a spring pressed element 234 adapted for coaction with the arm 230 of the switch MS1.

Carried by the bar 216 is a pointer 236 coacting with a scale 238 scribed upon the arm 214.

For limiting the downward swinging movement of the head frame, the arms 46 are provided with brackets 240 through which are threaded stop screws 242 adapted for coaction with the lower cutter bar 164. At the rear of the apparatus is a shaft 244, the opposite end portions of which are journalled respectively in a pair of bearings 246, which bearings are carried by the base section 12. The shaft 244 carries the supply roll of sheet material, designated 248.

Figure 12:
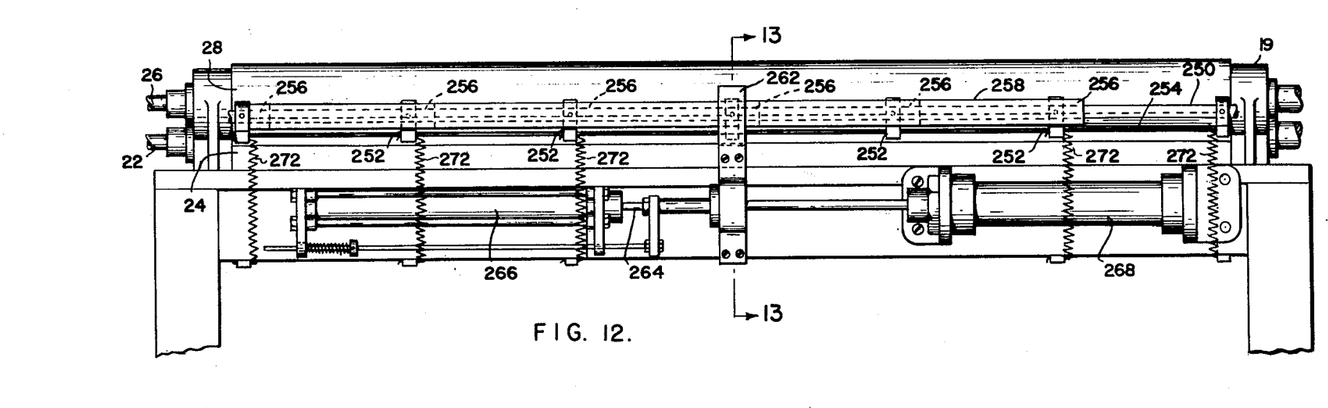
FIGURE 12 is a fragmentary section on the vertical plane indicated by line 12—12 of FIGURE 4.
Figure 13:
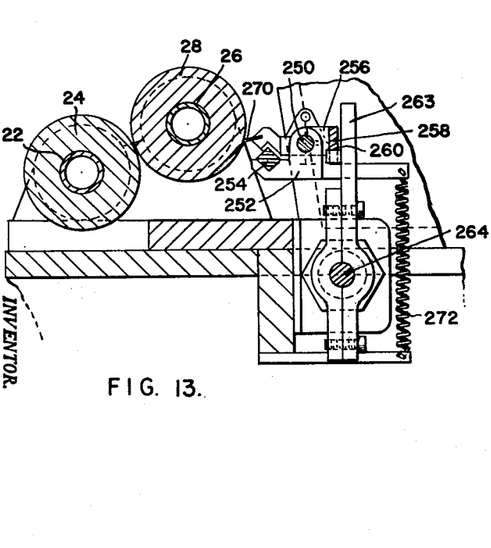
FIGURE 13 is an enlarged fragmentary section on the vertical plane indicated by line 13—13 of FIGURE 12.
Figure 14:
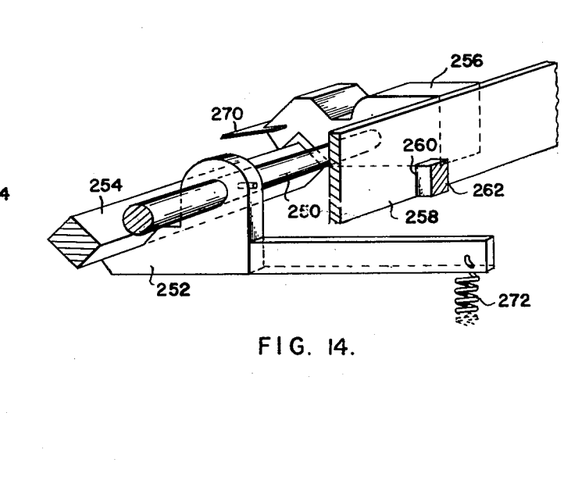
FIGURE 14 is a fragmentary perspective view of the scraper device shown in FIGURES 12 and 13.

Referring particularly to FIGURES 12, 13 and 14, associated with the roller 28 is a mechanism adapted for keeping the surface of the roller scraped clean. This mechanism includes a shaft 250 having opposite end portions journalled in suitable means carried by the base section 10 and having secured thereto a plurality of arms 252, corresponding end portions of which carry a bar 254. Slidably mounted upon the shaft 250 are a plurality of arms 256 having corresponding rear end portions affixed to a bar 258 which is notched, as at 260. The notched portion of this bar is fitted over an element 262 carried by an arm 263 which is secured to the rod 264 of a pneumatically actuated piston which works in a cylinder 266. The opposite end portion of the rod 264 is associated with a check mechanism 268. One end portion of each arm 256 is adapted to hold a scraper blade 270, the working edge of which engages the surface of the roller 28. The frame comprising the shaft 250, arms 252 and bar 254 is biased by a tension spring 272 in a direction to press the edges of the scrapers 270 against the surface of the roller 28.

Figure 15:
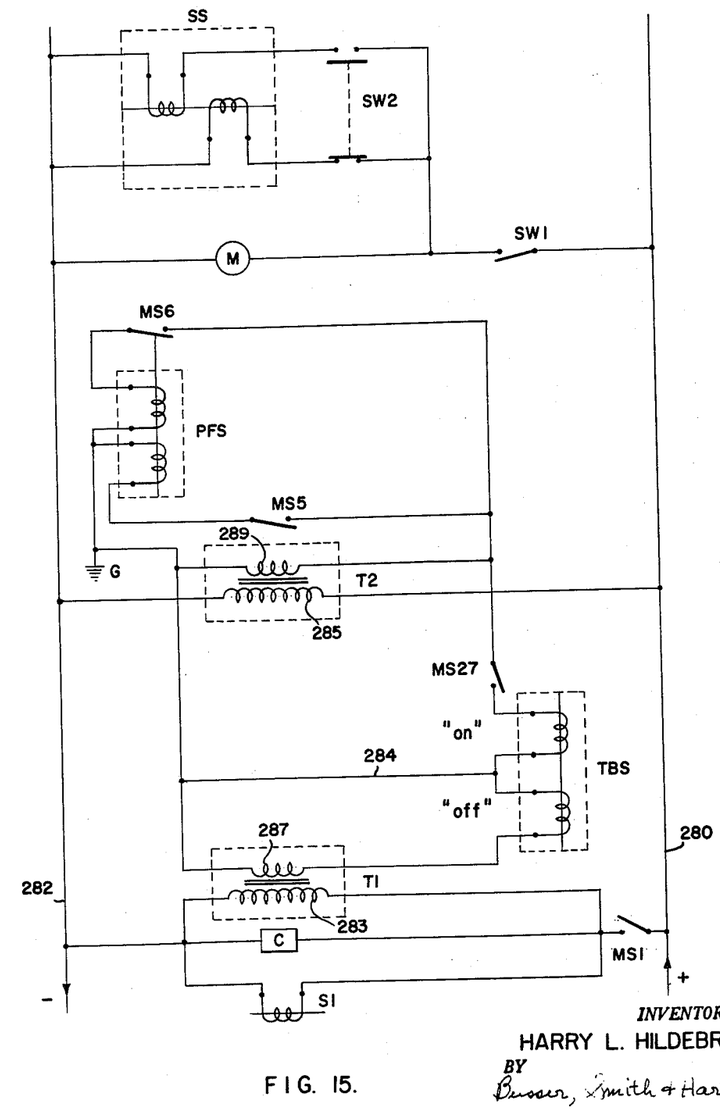
FIGURE 15 is a wiring diagram.

Referring particularly to FIGURE 15, electric power is supplied through main leads 280 and 282. The primary of a transformer T1, designated 283, the coil of a clutch C and a solenoid S1 are connected in parallel with each other and in series with the switch MS1 across leads 280 and 282. The primary of a transformer T2, designated 285, is connected across leads 280 and 282. One end of the secondary of the transformer T1, designated 287, is grounded at G, and one end of the secondary of the transformer T2, designated 289, is grounded at G. The coils of a tensioning solenoid TBS associated with the air cylinder 204 and an interlock switch MS27 are connected in series between the other ends of the secondaries respectively of the transformers T1 and T2, and a lead 284 connected between the coils of the tensioning solenoid runs to ground at G. The coils of a paper feed solenoid PFS associated with the air cylinder 178 are connected in parallel between the high side of the secondary of transformer T2 and ground. A manual paper feed switch MS5 and automatic paper feed switch MS6 are connected respectively in the parallel branches in series with the respective coils of the paper feed switch PFS. The motor M and a switch SW1 are connected in series across the leads 280 and 282. Each coil of a solenoid SS associated with the pneumatic cylinder 266 is connected across the motor between the switch SW1 and lead 282.

In the operation of the apparatus the switch SW1 is closed, whereupon the motor operates continuously. However, at this time the clutch is not engaged and therefore the motor idles. The operator manually threads the web 248 between the twister bars 196, between the feed roller 142 and the overlying hold-down roller 186 and over the stationary cutter bar 164. Switch MS5 is manually closed and then released. The associated coil of paper feed solenoid PFS is energized and the plunger is actuated to close paper feed switch MS6, whereupon the associated coil is energized. When switch MS5 is released, its associated coil is deenergized, but the coil associated with the switch MS6 remains energized and holds switch MS6 closed after switch MS5 reopens. The valve which controls the supply of air to the cylinder 178 is controlled by a solenoid that is energized when the switch MS6 is closed. The valve normally is in a neutral position, but when its solenoid is energized, the valve is operated to supply air to the cylinder 178 for advancing the rack 176. When the rack reaches the end of its excursion, the valve is automatically operated mechanically to supply air for return thereof to its initial position. As the rack approaches its initial position, the valve is automatically mechanically returned to neutral position and switch MS6 is automatically mechanically reopened, whereupon the coil associated with the latter is deenergized. The rack 176 and gears 170 and 168 operate to turn the feed roller 142 and to advance the end of the web of sheet material to a position over the rollers 24 and 28. The slip clutch 166 allows return of the rack 176 and gears 170 and 168 without actuation of the feed roller 142. A suitable pneumatic motor and solenoid controlled valve for use in feeding the sheet material is manufactured by The Bellows Company, Akron, Ohio.

The unit is known as a Bellows "BM2" air cylinder unit with electro air valve.

Figure 1:
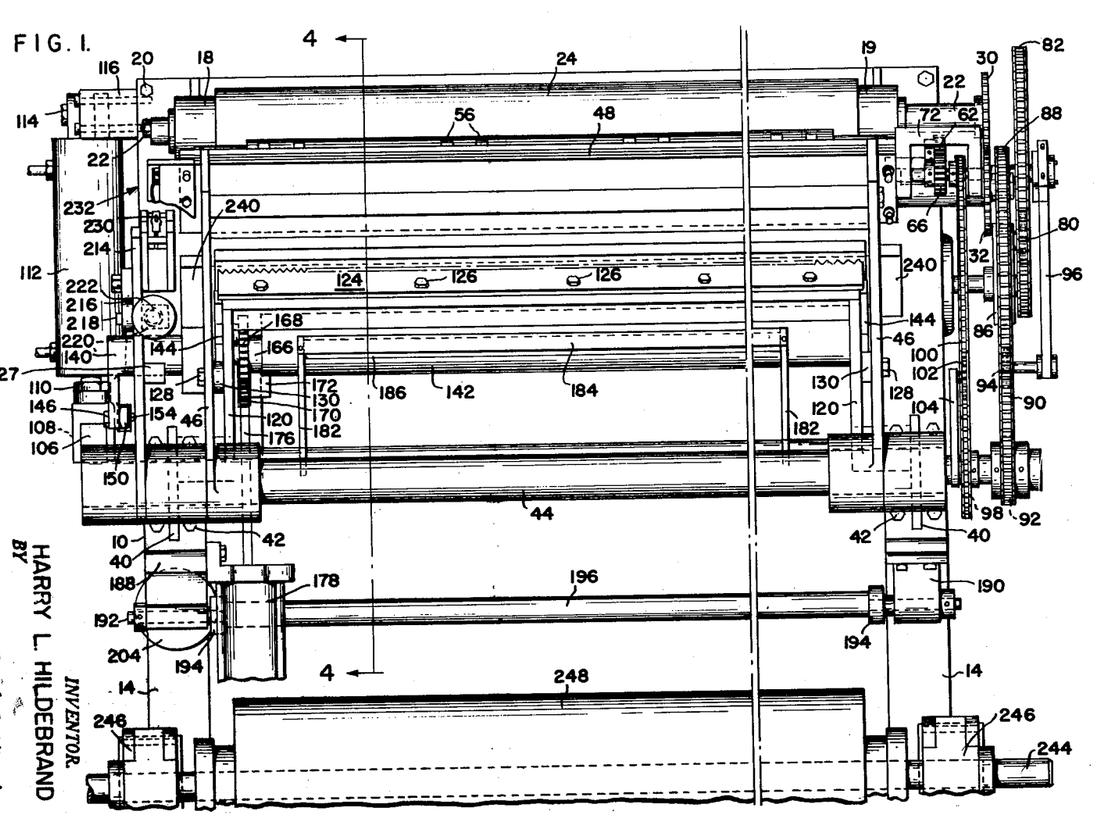
FIGURE 1 is a plan view of the apparatus.
Figure 2:
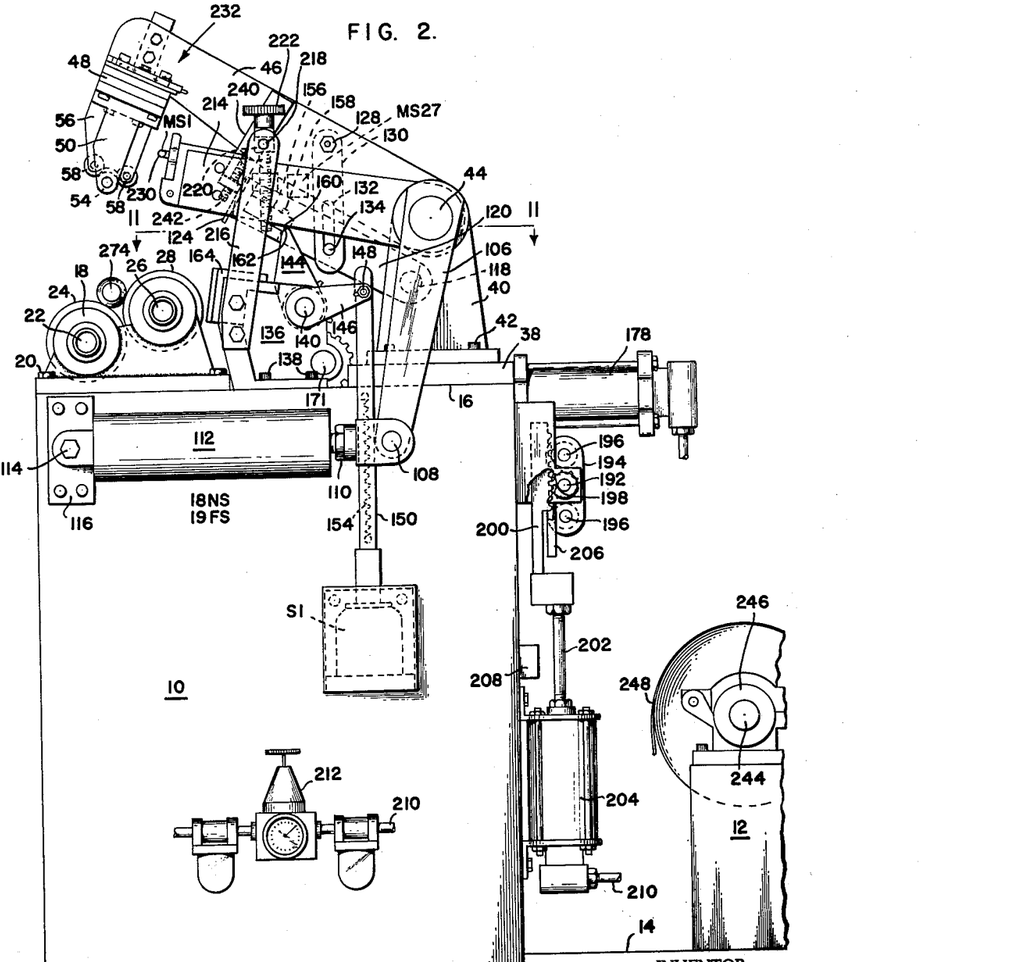
FIGURE 2 is one side evelation.
Figure 3:
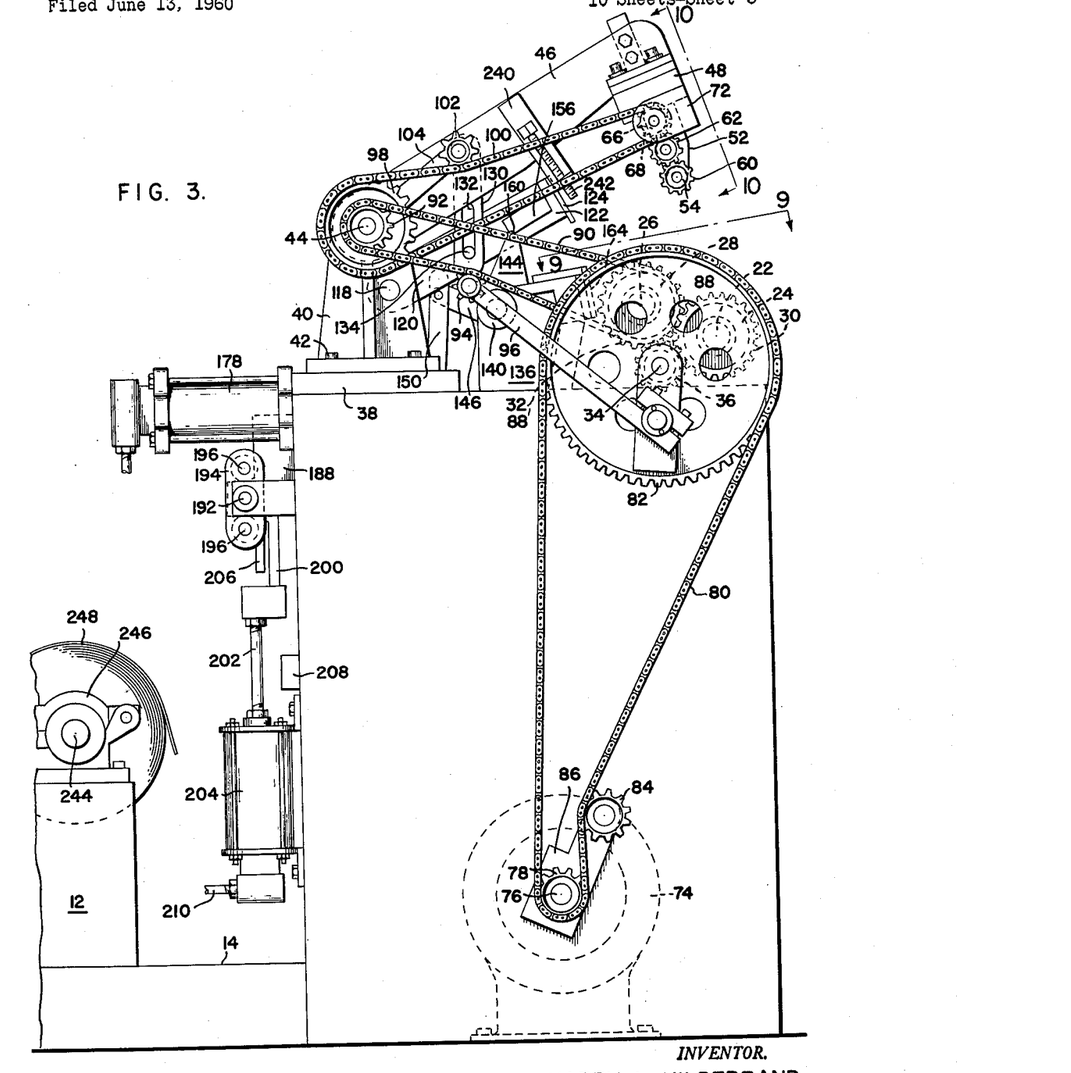
FIGURE 3 is the opposite side elevation.
Figure 4:
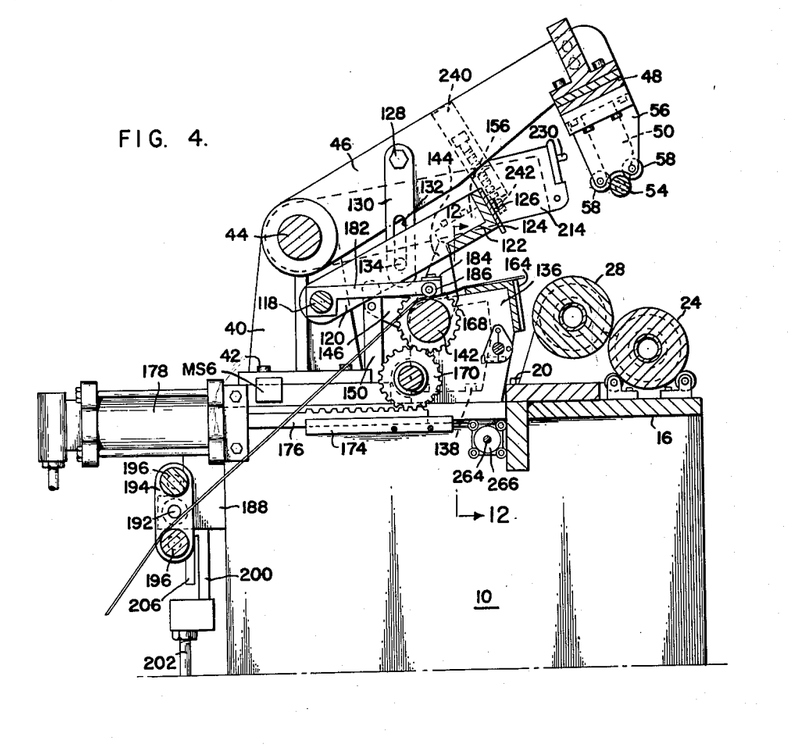
FIGURE 4 is a section on the vertical plane indicated by line 4—4 of FIGURE 1, the terminal portion of the web of sheet material being shown adjacent to the location of the cutting means.
Figures 5, 6:
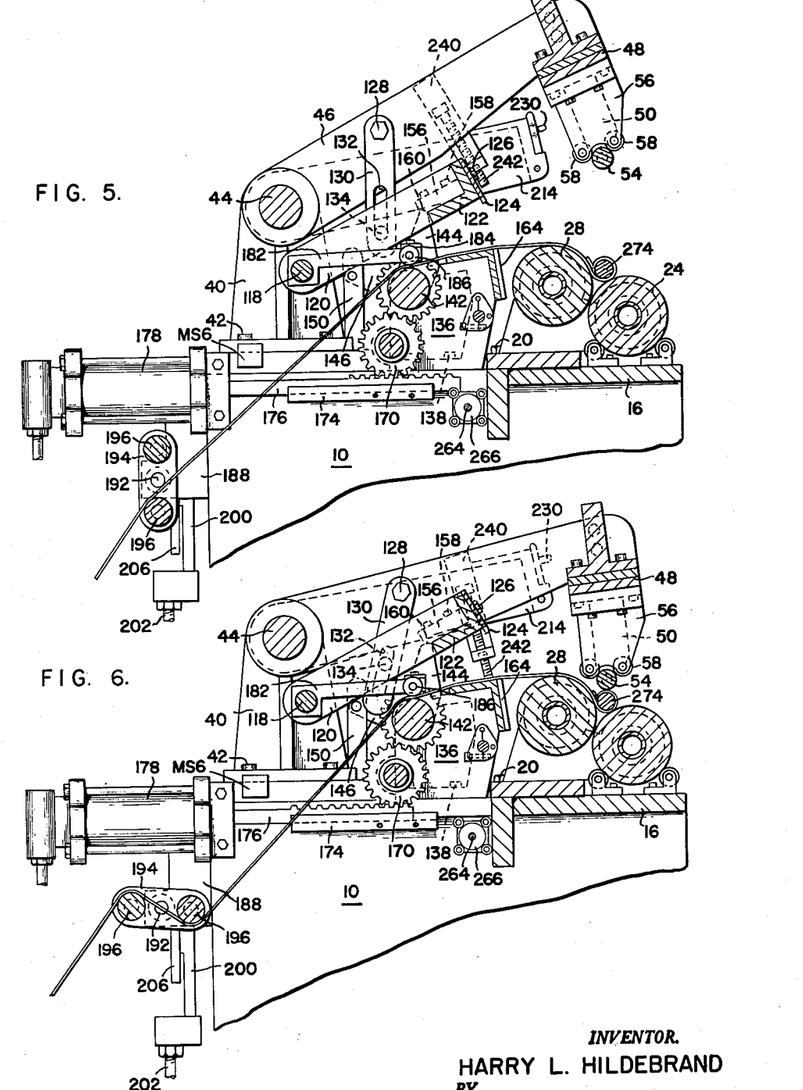
FIGURE 5 is the same as FIGURE 4, but shows the sheet material advanced still farther and the end thereof wrapped about the mandrel.
FIGURE 6 is the same as FIGURE 5, but shows the head of the apparatus in lowered position.

A mandrel in the form of a bar 274 is placed over the end portion of the web of sheet material and the latter is then wrapped around the mandrel once with the mandrel supported on the rollers 24 and 28, as shown, see FIGURE 5.

A hydraulic pressure-control valve (not shown) is now manually operated to supply hydraulic pressure from a suitable source to the cylinder 112, whereupon the head frame swings downwardly and the head roller 54 engages the sheet material wrapped around the mandrel, see FIGURE 6. As the head rail 48 descends, it automatically closes the switch MS27, whereupon the "on" coil of the tensioning solenoid TBS is energized. The plunger of the solenoid actuates a valve to supply air to the cylinder 204 for turning the tensioning frame and tensioning the web of material. The switch MS1 being open, the transformer T1 and the "off" coil of the tensioning solenoid TBS are deenergized. In this connection it will be noted that the lead 284 shorts the secondary of the transformer T1 and the "off" coil of the tensioning solenoid out of the circuit. The rod 202 of the piston working in the cylinder 204 floats by reason of a constant fluid pressure being applied within the cylinder 204. The desired pressure is regulated at 212 and the stroke of the rod 202 is limited by the stops 206 and 208. In this way, irrespective of the drag due to the size of the supply roll, which varies as the sheet material is consumed, the tension on the section of sheet material extending from the supply roll to the feed roller 142 is maintained constant. A suitable pneumatic motor and control valve for operating the tensioning device is manufactured by The Bellows Company, Akron, Ohio, and is known as the Bellows "EV" Electroaire Valve, Model EV5B, and a suitable unit for use at 212 is manufactured by The Bellows Company, Akron, Ohio, and is known as the Lubro Control Unit, Model 55B2.

The clutch is now operated manually and the motor turns the head roller 54 and the rollers 24 and 28 at the same surface speed and the tube is formed. When the tube is of a predetermined diameter, the switch MS1 closes, switch MS27 reopens and the motor is declutched—all automatically. Declutching causes the head roller 54 and the rollers 24 and 28 to cease operation. Closing of switch MS1 and reopening of switch MS27 causes deenergization of "on" coil of the tensioning solenoid TBS and energization of the "off" coil of the tensioning solenoid TBS. The tensioning device returns to its initial position, releasing the sheet material. Simultaneously, the paper cutoff solenoid S1 is energized, whereupon the cams 144 are withdrawn from under the cutter frame. The latter descends by its own weight and the cutter bar 124 coacting with the stationary cutter bar 164 severs the web of sheet material. Feed roller 142 and hold-down roller 186 retain the leading portion of the sheet material extending from the supply roll in its advanced position adjacent cutter bar 164. The plunger of the solenoid S1 is returned to its initial position by the tension of spring 154. It will be noted that the tensioning device returns to its initial position very shortly before the cutting operation takes place, and the latter operation takes place shortly before the clutch is operated.

By manipulating the adjusting screw 222 the fore end portion of the arm 214 and the switch MS1 mounted thereon may be raised or lowered as required for actuation of the switch arm 230 by the element 234 at the point in the cycle of the operation when the tube is of a predetermined diameter. To facilitate adjustment of the arm 214, the operator may observe the reading of pointer 236 on the scale 238.

Now the hydraulic pressure-control valve is manually operated to supply fluid pressure to the opposite end of the cylinder 112. The head rail is elevated, whereupon the switch MS1 is reopened automatically. Switch MS1 is now open and the tensioning solenoid TBS is in neutral position. The motor, which is manually clutched and automatically declutched, as indicated hereinbefore, remains declutched. The cutter bar is elevated by the head rail and the supporting cams are returned to their initial positions by spring-pressure. The next cycle begins with the switch SW1 closed, but otherwise it is the same as just described.

When the switch SW1 is closed, one coil of the scraper solenoid SS is energized through a pair of closed contacts of the switch SW2. The plunger of the solenoid is actuated and a valve is operated thereby to supply air to one end of cylinder 266. As the scraper device approaches the end of its excursion it opens the closed contacts of switch SW2 and closes a second pair of contacts, whereupon the first coil is deenergized and the second coil is energized. The plunger of the solenoid is again actuated and the valve is operated to supply air to the other end of the cylinder 266. As the scraper device approaches the end of its excursion in the opposite direction, it reopens the second pair of contacts and recloses the first pair of contacts. Thus the scrapers move back and forth automatically and operate continuously to keep the surface of the roller 28 free from resins deposited from the sheet material. A satisfactory air cylinder for use at 266 is manufactured by The Bellows Company, Akron, Ohio, and is known as a BM-5C Series Air Cylinder, and a satisfactory check for use at 268 is manufactured by The Bellows Company, Akron, Ohio, and is known as the HC-12-40 Hydro Check. It will be noted that during the operation of the machine, the rollers 24 and 28 are maintained in heated condition by steam supplied through the tubular shafts 22 and 26 and that the mandrel 274 is heated. As the sheet material passes over the roller 28, the softened resins form a coating on the surface of the roller which must be removed for proper operation of the apparatus.

It will be understood, of course, that the present invention, as shown and described, is susceptible of various changes and modifications which may be made without any departure from the general principles or real spirit of this invention. Accordingly, it is intended to claim the present invention broadly as well as specifically as indicated in the appended claims.

What is claimed is:

1. In apparatus for winding sheet material about a mandrel to form laminated tubular stock, the combination comprising means for revolvably mounting a supply roll of said sheet material, means adapted for serving as a cradle for said mandrel and a portion of said sheet material wrapped about said mandrel, said sheet material portion being the terminal portion of a section of sheet material drawn from said supply roll, a pressure roller adapted for engaging said sheet material portion and operable for turning said mandrel to draw sheet material from said supply roll and to wind it about said mandrel to form said laminated tubular stock, a pivotally mounted frame having said sheet material threaded therethrough, means for turning said frame about its pivotal axis including a fluid pressure motor adapted for applying a variable turning force upon said frame for maintaining said sheet material section uniformly tensioned, means operable for cutting said sheet material section, means for maintaining said turning force upon said frame substantially from the time the winding operation begins to the time the cutting operation occurs, and means automatically responsive to a predetermined maximum outside diameter of said tubular stock for actuating said cutting means and terminating said winding operation.

2. In apparatus for winding sheet material about a mandrel to form laminated tubular stock, the combination comprising means for revolvably mounting a supply roll of said sheet material, means adapted for serving as a cradle for said mandrel and a portion of said sheet material wrapped about said mandrel, said sheet material portion being the terminal portion of a section of sheet material drawn from said supply roll, a pressure roller adapted for engaging said sheet material portion and operable for turning said mandrel to draw sheet material from said supply roll and to wind it about said mandrel to form said laminated tubular stock, a pivotally mounted frame having said sheet material threaded therethrough, means for turning said frame about its pivotal axis including a fluid pressure motor adapted for applying a variable turning force upon said frame for maintaining said sheet material section uniformly tensioned, fluid pressure regulating means, said fluid pressure motor being responsive to said pressure regulating means for maintaining a predetermined selected uniform tension on said web, means operable for cutting said sheet material section, means for maintaining said turning force upon said frame substantially from the time the winding operation begins to the time the cutting operation occurs, and means automatically responsive to a predetermined maximum outside diameter of said tubular stock for actuating said cutting means and terminating said winding operation.

3. In apparatus for winding sheet material about a mandrel to form laminated tubular stock, the combination comprising means for revolvably mounting a supply roll of said sheet material, means adapted for serving as a cradle for said mandrel and a portion of said sheet material wrapped about said mandrel, said sheet material portion being the terminal portion of a section of sheet material drawn from said supply roll, a pressure roller adapted for engaging said sheet material portion and operable for turning said mandrel to draw sheet material from said supply roll and to wind it about said mandrel to form said laminated tubular stock, means operable for cutting said sheet material section, means automatically responsive to a predetermined maximum outside diameter of said tubular stock for actuating said cutting means and terminating said winding operation, and means operatively interposed between said cutting means and supply roll and operable in each cycle for automatically feeding said sheet material portion to the mandrel for being wrapped thereabout and for holding said sheet material after said cutting means operates including a revolvable feed roller, rack and pinion means, and slip clutch means operatively interposed between said feed roller and rack and pinion means and means to reciprocate said rack.

References Cited in the file of this patent
UNITED STATES PATENTS

| | | |
|---|---|---|
| 1,680,979 | Gardner | Aug. 14, 1928 |
| 2,300,903 | Broughton | Nov. 3, 1942 |
| 2,318,504 | Lodding | May 4, 1943 |
| 2,621,736 | Scruggs et al. | Dec. 16, 1952 |
| 2,676,764 | Aulen | Apr. 27, 1954 |
| 2,685,417 | Bartelson | Aug. 3, 1954 |
| 2,830,775 | Kiesel | Apr. 15, 1958 |
| 2,845,231 | Grettve | July 29, 1958 |
| 2,939,645 | Rowlands | June 7, 1960 |
| 2,989,262 | Hornbostel | June 20, 1961 |
| 2,999,653 | Ganz | Sept. 12, 1961 |